United States Patent
Wang (10) Patent No.: US 9,451,080 B2
(45) Date of Patent: Sep. 20, 2016

(54) TERMINAL COMMUNICATIONS DISPLAY METHOD AND TERMINAL

(75) Inventor: Xiushuai Wang, Shenzhen (CN)

(73) Assignee: ZTE Corporation, Shenzhen, Guangdong Province (CN)

(*) Notice: Subject to any disclaimer, the term of this patent is extended or adjusted under 35 U.S.C. 154(b) by 0 days.

(21) Appl. No.: 14/405,421
(22) PCT Filed: Jun. 18, 2012
(86) PCT No.: PCT/CN2012/077103
§ 371 (c)(1), (2), (4) Date: Dec. 4, 2014
(87) PCT Pub. No.: WO2013/155780
PCT Pub. Date: Oct. 24, 2013

(65) Prior Publication Data
US 2015/0119110 A1 Apr. 30, 2015

(30) Foreign Application Priority Data
Apr. 18, 2012 (CN) .......................... 2012 1 0114553

(51) Int. Cl.
H04M 1/725 (2006.01)
H04M 1/663 (2006.01)
(Continued)

(52) U.S. Cl.
CPC .............. H04M 3/36 (2013.01); G06F 3/0481 (2013.01); H04M 1/274583 (2013.01);
(Continued)

(58) Field of Classification Search
CPC ........... H04M 3/436; H04M 3/53333; H04M 15/56; H04M 1/72552; H04M 1/72519; H04M 3/42051; H04M 2250/60; H04M 3/42042; H04M 1/57; H04M 1/274583; H04M 3/42059; H04M 2203/2072; H04M 2203/551; H04M 15/58; H04W 4/12; H04W 4/14; H04W 4/18; H04W 16/18; H04W 4/02; H04W 8/18; H04W 68/00; H04W 88/02; H04W 68/005; H04W 4/16; H04W 76/02

USPC ....... 455/567, 405, 412.1, 412.2, 414.1, 566
See application file for complete search history.

(56) References Cited

U.S. PATENT DOCUMENTS 7,099,669 B2 * 8/2006 Sheffield ............... H04W 24/08
 455/423
8,233,888 B1 * 7/2012 Koller ................. H04M 1/6505
 455/412.1
(Continued)

FOREIGN PATENT DOCUMENTS

CN 1972322 A 5/2007
CN 102075631 A 5/2010
(Continued)

OTHER PUBLICATIONS

International Search Report for PCT/CN2012/077103 dated Dec. 20, 2012.

Primary Examiner — Olumide T Ajibade Akonai
(74) Attorney, Agent, or Firm — Ling Wu; Stephen Yang; Ling and Yang Intellectual Property (57) ABSTRACT

A communication display method and a terminal are disclosed, and the method includes: when detecting that a terminal user is communicating with a contact, a central processor module retrieving communication statistics information of the terminal user with the contact in a program storage module and sending it to a user interface management module; the user interface management module displaying the communications statistics information after receiving it; after the communication between the terminal user and the contact ends, the central processor module updating and storing the communications statistics information in the program storage module. The abovementioned technical solution makes it convenient for the user to accurately learn the communications statistics information with the contact, which is favorable for the user making judgment and action on the current communication.

14 Claims, 3 Drawing Sheets

(51) Int. Cl.
  *H04M 3/36* (2006.01)
  *H04M 1/2745* (2006.01)
  *G06F 3/0481* (2013.01)
  *H04W 8/18* (2009.01)
  *H04W 24/08* (2009.01)
  *H04W 4/16* (2009.01)

(52) U.S. Cl.
  CPC ....... *H04M 1/72519* (2013.01); *H04W 8/183* (2013.01); *H04W 24/08* (2013.01); *H04M 2250/60* (2013.01); *H04W 4/16* (2013.01)

(56) References Cited

U.S. PATENT DOCUMENTS

| | | | |
|---|---|---|---|
| 8,352,561 B1* | 1/2013 | Denise | G06Q 10/107 |
| | | | 340/309.7 |
| 2007/0004383 A1* | 1/2007 | Agozo | H04M 3/42195 |
| | | | 455/414.1 |
| 2007/0049335 A1* | 3/2007 | Haitani | G06F 3/0481 |
| | | | 455/556.2 |
| 2007/0174432 A1* | 7/2007 | Rhee | H04M 1/72522 |
| | | | 709/219 |
| 2010/0069045 A1 | 3/2010 | Grignani et al. | |
| 2010/0135470 A1* | 6/2010 | Bishop | H04M 7/006 |
| | | | 379/32.01 |
| 2010/0159994 A1 | 6/2010 | Stallings et al. | |
| 2011/0039530 A1 | 2/2011 | Lim | |
| 2011/0200182 A1 | 8/2011 | Kodama et al. | |
| 2012/0172009 A1* | 7/2012 | Wilkerson | H04M 1/6091 |
| | | | 455/414.1 |

FOREIGN PATENT DOCUMENTS

| | | |
|---|---|---|
| CN | 101998451 A | 3/2011 |
| CN | 102217293 A | 10/2011 |
| WO | 03056789 A1 | 7/2003 |

* cited by examiner

TERMINAL COMMUNICATIONS DISPLAY METHOD AND TERMINAL

TECHNICAL FIELD

The present document relates to the field of mobile communication, and more particularly, to a terminal communication display method and a terminal.

BACKGROUND OF THE INVENTION

With the progress of society and technology, there are more and more contacts stored in a mobile phone terminal. Currently the mobile phone supports static query of the contact information when offline or during a call. The displayed information is the user pre-entered and stored information such as contact names, addresses, numbers, even head image, and locations. However, there are no dynamic statistics and display of the communication situations of the user with the contacts in the related art, which is against the user understanding the communication situation of both parties and making judgments and actions. For example, when the user communicates with a contact, the user often does not know the statistics information of the current communication in the overall communications: for example, the number of incoming calls, the number of outgoing calls, duration of incoming calls, duration of outgoing call, and the number of sent and received text messages, how long have not contacted, and contact intimacy ranking of this contact, as well as which contacts are the most frequent contacts, and which contacts need to be contacted as soon as possible, and so on.

SUMMARY

The purpose of the embodiment of the present document is to provide a terminal communication display method and a terminal, to better address the problem that the terminal user is not clear about the communication statistics information of a contact when communicating with the contact and thus it is not favorable for the user making judgment and action on the current communication.

To solve the abovementioned technical problem, the embodiment of the present document uses the following technical solution:

a terminal communication display method, and the method comprises:

when detecting that a terminal user is communicating with a contact, a central processor module retrieving communication statistics information of the terminal user with the contact in a program storage module and sending the communication statistics information to a user interface management module;

the user interface management module displaying the communication statistics information after receiving it;

after the communication of the terminal user with the contact ends, the central processor module updating and storing the communication statistics information into the program storage module.

Alternatively, the step of the central processor module detecting that the terminal user is communicating with the contact comprises:

the central processor module detecting that the terminal user is in a call with the contact; or the central processor module detecting that the terminal user is sending/receiving messages to/from the contact.

Alternatively, the communication statistics information comprises:

last communication information of the terminal user with the contact;

communication ranking information of the terminal user with the contact; and/or, contact frequency information of the terminal user with the contact.

Alternatively, the step of the user interface management module displaying the communication statistical information after receiving the communication statistical information comprises:

after receiving the communication statistics information, the user interface management module displaying the communication statistical information before the call is connected, while no longer displaying the communication statistical information after the call is connected;

after receiving the communication statistics information, the user interface management module keeping on displaying the communication statistical information before as well as after the call is connected, and no longer displaying the communication statistical information after the call ends; or after receiving the communication statistics information, the user interface management module displaying the communication statistics information when receiving or sending messages.

Alternatively, the step of the central processor module updating the communication statistics information comprises:

the central processor obtaining current communication information with the contact;

the central processor updating the communication statistical information according to the current communication information.

Alternatively, the method further comprises:

the central processor sending a contact reminder notification to the user interface management module when the contact frequency in the contact frequency information is less than a preset contact frequency threshold;

after receiving the contact reminder notification, the user interface management module displaying the contact reminder message on a screen of the terminal.

A communication display terminal, and the terminal comprises: a program storage module, a central processor module, a user interface management module present document, wherein:

the program storage module is configured to: store communication statistics information of a terminal user with contacts;

the central processor module is configured to: when detecting that the terminal user is communicating with the contact, retrieve the communication statistical information of the terminal user with a contact in the program storage module and send the communication statistics information to the user interface management module;

the user interface management module is configured to: receive and display the communication statistics information;

the central processor module is configured to: update and store the communication statistics information in the program storage module after the communication of the terminal user with the contact ends.

Alternatively, the terminal further comprises a man-machine interface module, wherein:

the man-machine interface module is configured to: detect that the terminal user is in a call with the contact or sending/receiving messages to/from the contact.

Alternatively, the user interface management module is further configured to:

after receiving the communication statistics information, display the communication statistics information before the call is connected, no longer display the communication statistics information after the call is connected;

keep on displaying the communication statistics information before the call is connected, and no longer display the communication statistics information after the call ends; or, display the communication statistics information when receiving or sending messages.

Alternatively, the central processor module is further configured to: collect current communication information with the contact, and update the communication statistics information according to the current communication information.

Compared with the related art, the beneficial effects of the embodiments of the present document are that: it is convenient for the user to accurately understand the communication statistical information with the contact, so as to be favorable for the user making judgments and actions on the current communication.

PREFERRED EMBODIMENTS OF THE INVENTION

Hereinafter, in conjunction with the accompanying drawings, the preferred embodiments of the present document will be described in detail. It should be understood that, the preferred embodiments described in the following are only used to illustrate and explain rather than limit the present document.

Figure 1:
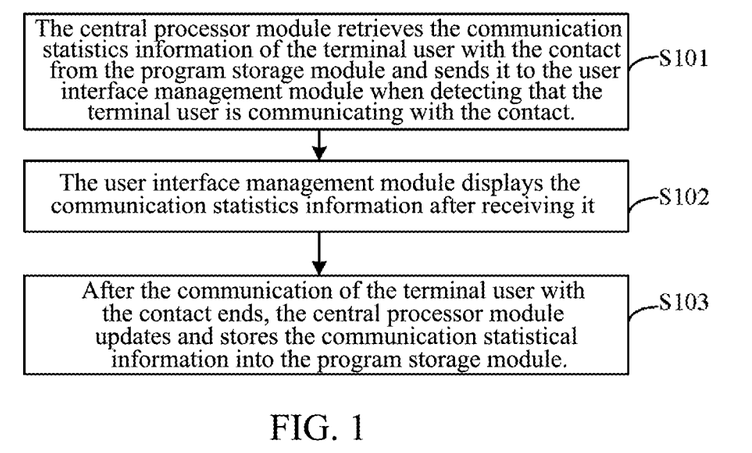
FIG. 1 is a flow chart of a terminal communication display method provided in a first embodiment of the present document.

FIG. 1 is a flow chart of a terminal communication display method provided in the first embodiment of the present document, and as shown in FIG. 1, the method comprises:

In step S101, the central processor module retrieves the communication statistics information of the terminal user with the contact from the program storage module and sends it to the user interface management module when detecting that the terminal user is communicating with the contact.

When detecting that the terminal user is in a call with the contact, or the terminal user is receiving a short message (SMS) or multimedia message (MMS) sent by the contact, or the terminal user is sending a text or multimedia message to the contact, the man-machine interface module notifies the central processor module, the central processor module retrieves the communication statistical information of the contact from the program storage module and sends it to the user interface management module after receiving the notification from the man-machine interface module.

The communication statistical information comprises the last communication information and/or the communication ranking information and/or the contact frequency information of the terminal user with the contact. Specifically, the last communication information of the terminal user with the contact comprises: date and time, call type (incoming, outgoing), and call duration of the last call of the terminal user with the contact, and date and time, messaging mode (SMS, MMS), and messaging type (receiving, sending) when the terminal user receives/sends messages to/from the contract last time, and so on; the contact frequency information of the terminal user with the contact comprises: contact frequency, percentage distribution of the contact time periods, and so on, wherein the contact frequency can be quantitatively displayed according to the statistical calculation result, for example, it can be displayed as: contact once a month or once a week or three times a day; it can also be qualitatively displayed according to the statistical calculation result, for example, it is displayed as: very frequent, frequent, normal, rare, never contact, and so on; the communication ranking information of the terminal user with the contact comprises: the number of incoming calls from the contact and the ranking of the number of the incoming calls of the contact in all the contacts, the number of outgoing calls of the contact and the ranking of the number of outgoing calls of the contact in all the contacts, the total number of incoming and outgoing calls of the contact and the ranking of the total number of incoming and outgoing calls of the contact in all the contacts, the number of times of receiving messages from the contact, the ranking of the number of times of receiving messages from the contact in all the contacts, the number of times of sending messages to the contact, the ranking of the number of times of sending messages to the contact in all the contacts, the total number of times of sending and receiving messages to and from the contact, as well as the ranking of the total number of times of sending and receiving messages to and from the contact in all the contacts.

In Step S102, the user interface management module displays the communication statistics information after receiving it.

After the user interface management module receives the communication statistics information, the user interface management module displays it before the call is connected, and no longer displays it after the call is connected; alternatively, the user interface management module keeps on displaying the communication statistics information before and after the call is connected, and no longer displays it after the call ends. If the terminal user contacts with the contact via information such as SMS or MMS, after receiving the communication statistics information, the user interface management module displays it when receiving or sending the abovementioned information. If the communication statistics information cannot be displayed completely in one screen, it can be displayed in multiple screens. In the multi-screen display, the user can view the remaining screens by turning pages or switching the screens.

The user can pre-configure the corresponding statistics options which would be displayed. The terminal user can pre-configure the contents of the displayed communication statistics information as which specific options according to the user own needs.

The user can also preset white and black lists as needed, and set displaying or not displaying the communication statistics information for certain contacts. If the user does not preconfigure, for all the contacts, their communication statistics information is displayed by default during communication. The user can also choose to display the last N incoming and outgoing messages simultaneously in the communication statistics information.

In Step S103, after the communication of the terminal user with the contact ends, the central processor module updates and stores the communication statistical information into the program storage module.

The central processor module obtains the current communication information with the contact after detecting that the communication of the terminal user with the contact ends, and updates the communication statistics information according to the current communication information, and stores the updated communication statistics information into the program storage module.

Figure 2:
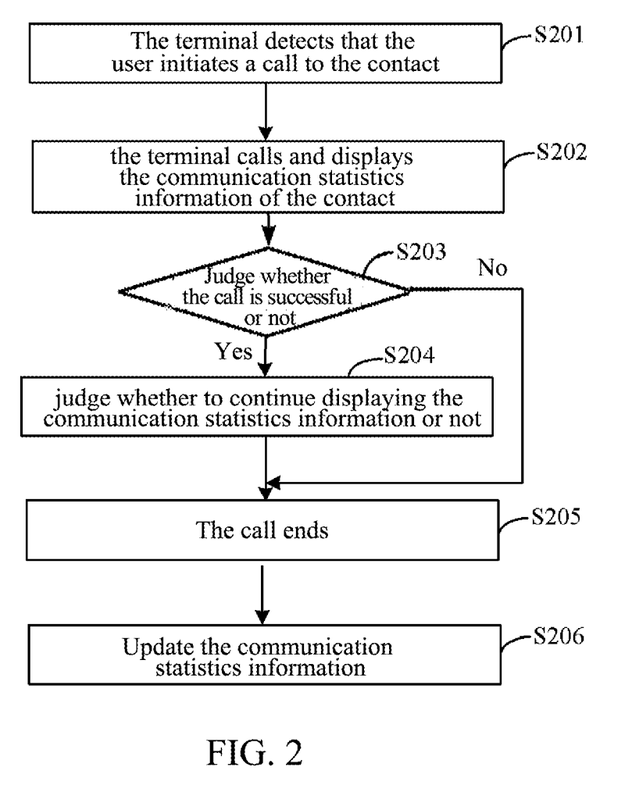
FIG. 2 is a flow chart of a terminal communication display method provided in a second embodiment of the present document.

FIG. 2 is a flow chart of a terminal communication display method when the user actively initiates a call in accordance with the second embodiment of the present document, and as shown in FIG. 2, the method comprises:

In Step S201, the terminal detects that the user initiates a call to the contact.

The man-machine interface module of the terminal detects that the terminal user initiates a call to a certain contact. The contact may correspond to a plurality of cell phone numbers, telephone numbers or other contact numbers. No matter which number that the terminal user dials, as long as the correspondence is the contact, the central processor module considers that the terminal user is communicating with the contact.

In Step S202, the terminal calls and displays the communication statistics information of the contact.

The man-machine interface module notifies the central processor module after detecting that the user initiates a call to the contact, and the central processor module retrieves the communication statistics information of the terminal user with the contact from the program storage module according to the contact ID and sends it to the user interface management module. After receiving the communication statistics information of the contact, the user interface management module displays it in the display time periods defaulted by the terminal or pre-configured by the terminal user.

The user can set up black and white lists as needed, and allow to display the communication statistics information for certain contacts while not display the communication statistics information for certain other contacts. If the user does not have a pre-configuration, the communication statistics information of all contacts is displayed by default.

In Step S203, it is to judge whether the call is successful or not.

The central processor module judges whether the call is successful or not, if it is not successful, notifies the user interface management module to no longer display the communication statistics information, and step 205 is executed; if the call is successful, it is to enter into the call state, and step S204 is executed;

In step S204, it is to judge whether to continue displaying the communication statistics information or not.

According to the setting defaulted by the terminal or pre-configured by the terminal user, it is to judge whether to keep on displaying the communication statistics information or not. If the setting is that the display disappears during the call, the user interface management module displays the communication statistics information before the call is connected, while no longer displays the communication statistics information after the call is connected. If the setting is that it is to continue displaying during the call, the user interface management module keep on displaying the communication statistics information of the contact before the call is connected and during the call.

In Step S205, the call ends.

The central processor module detects that the call ends and notifies the user interface management module, and the user interface management module no longer displays the communication statistics information after receiving the call ending notification.

In Step S206, it is to update the communication statistics information.

The central processor module records the current call information with the contact, and updates the communicate statistics information of the contact and the ranking-related information in the communication statistics information of other contacts according to the current call information. The central processor module collects the communication statistics information of the contact according to a certain cycle, and it is defaulted to accumulate statistically all the communications with the contact from the time that the terminal enables the method provided in the embodiment of the present document to time before the current communication or inquiry, meanwhile, the user is also supported to collect based on the user's self-defined time period of collection, which is, for example, defined as the last 365 days, the last 180 days, the last 60 days, and so on.

Figure 3:
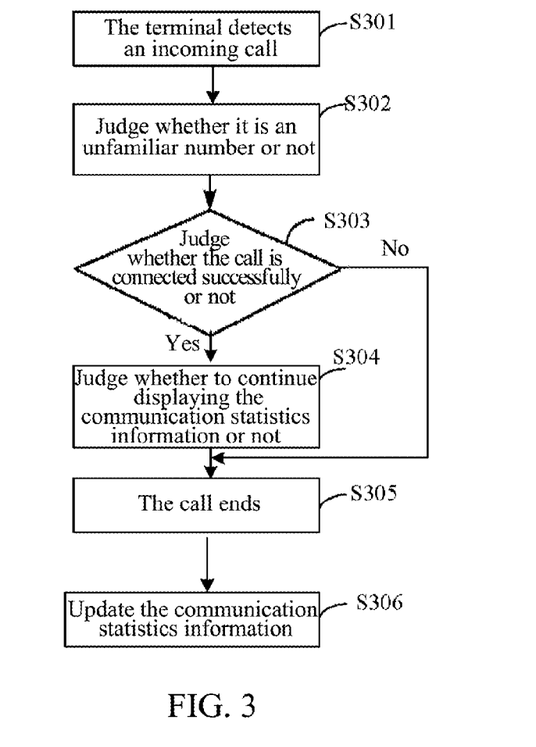
FIG. 3 is a flow chart of a terminal communication display method when a user is receiving a call provided in a third embodiment of the present document.

FIG. 3 is a flow chart of a terminal communication display method when the user receives a call in accordance with a third embodiment of the present document, as shown in FIG. 3, the method comprises:

In step S301, the terminal detects an incoming call.

The man-machine interface module of the terminal detects that the terminal user receives a call from another terminal user and notifies the detected incoming call event to the central processor module.

In Step S302, it is to judge whether it is an unfamiliar number or not.

After the central processor module receives the incoming call event notification, it checks whether the incoming number corresponds to a certain contact or not, that is, whether the number is registered under the name of a certain contact or not. If the incoming call number corresponds to a certain contact, the communication statistics information of the contact is inquired in the program storage module and sent to the user interface display module. After receiving the communication statistics information, the user interface display module displays it on the screen of the terminal, otherwise only displays an unknown number.

The contact may have a variety of different contact modes, such as a plurality of numbers, even virtual numbers, and the communication records based on multiple numbers or virtual numbers are collected under one contact.

In Step 303, it is to judge whether the call is connected successfully or not.

The man-machine interface module detects the operations of the terminal user in real time, and notifies the central processor module that the user ends the call if detecting that the terminal user ends a call, after the central processor module receives the notification that the user ends the call, it sends a user ending call message to the user interface management module, the user interface management module controls to no longer display the communication statistics information, and step S305 is executed, otherwise, step S304 is executed.

In Step S304, it is to judge whether to continue displaying the communication statistics information or not.

Based on the setting defaulted by the terminal or pre-configured by the terminal user, it is to judge whether to continue displaying the communication statistics information or not. If the setting is that the display disappears during the call, the user interface management module displays the communication statistics information before the call is connected, while no longer displays the communication statistics information after the call is connected. If the setting is that it is to continue displaying during the call, the user interface management module keeps on displaying the communication statistics information of the contact before the call is connected and during the call.

In Step S305, the call ends, and the communication statistics information is not displayed any longer.

The central processor module detects that the call ends, and notifies the user interface management module, after receiving the call ending notification, the user interface management module no longer displays the communication statistics information.

In Step S306, it is to update the communication statistics information.

The central processor module records the current call information with the contact, and updates the communication statistics information of the contact and the ranking-related information in the communication statistics information of other contacts according to the current call information.

Figure 4:
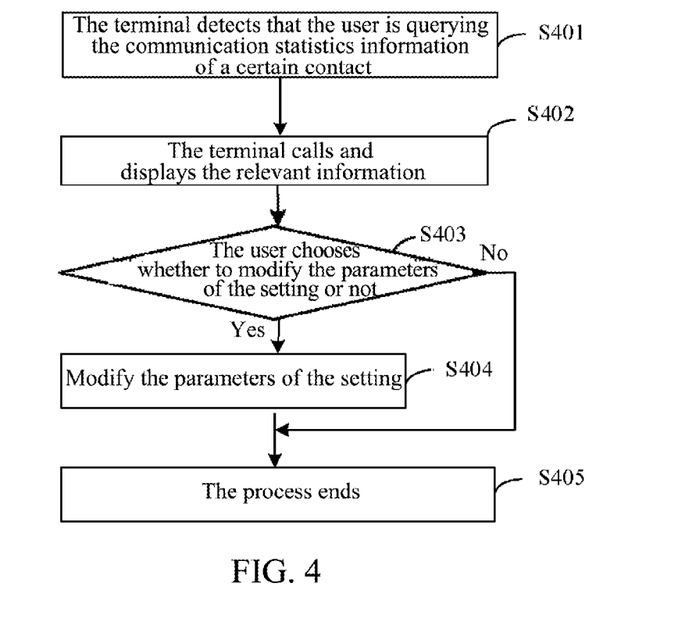
FIG. 4 is a flow chart of a terminal communication display method when a user is querying communication statistics information of a contact provided in a fourth embodiment of the present document.

FIG. 4 is a flow chart of a terminal communication display method when the user is querying the communication statistical information of a contact in accordance with the fourth embodiment of the present document, as shown in FIG. 4, the method comprises:

In Step S401, the terminal detects that the user is querying the communication statistics information of a certain contact.

The man-machine interface module detects that the terminal user is retrieving a certain contact, and further detects that the terminal user is querying the communication statistics information of the contact after retrieving the contact.

In Step S402, the terminal calls and displays the communication statistics information.

The man-machine interface module sends the detected inquiry notification to the central processor module, the central processor module retrieves the communication statistics information of the contact in the program storage module according to the contact ID, and sends it to the user interface management module. After receiving the communication statistics information, the user interface management module displays it on the screen of the terminal.

In Step S403, it is to judge whether the user modifies the parameters of the setting or not.

The man-machine interface module detects the operations of the terminal user, and if detecting that the terminal user modifies the parameters of the setting, step S404 is executed, otherwise the current process ends.

In Step S404, the user modifies the setting-related parameters.

The man-machine interface module detects that the terminal user modifies the setting-related parameters such as contact frequency, time period of displaying the communication statistics information, and so on. The man-machine interface module sends the modified parameters to the central processor module, and the central processor module modifies the parameter configuration information stored in the program storage module according to the user's setting.

In Step S405, the process ends.

The man-machine interface module detects that the terminal user exits from setting the parameters or the user does not modify the parameters, and then notifies the central processor module, and the central processor module ends this process.

Figure 5:
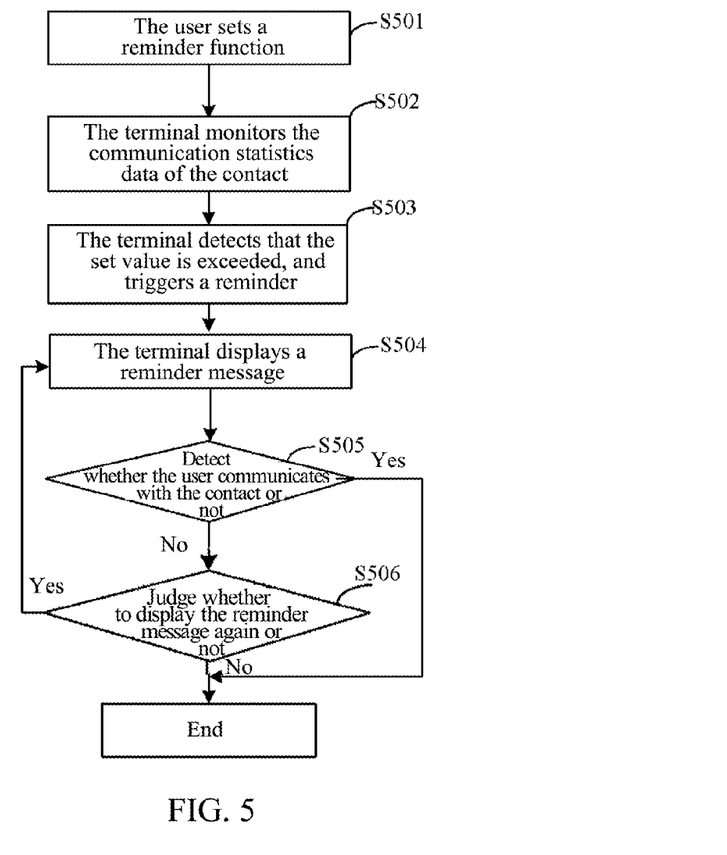
FIG. 5 is a flow chart of a method for reminding the user according to the communication statistics information provided in a fifth embodiment of the present document.

FIG. 5 is a flow chart of a method for reminding the user based on the communication statistics information in accordance with the fifth embodiment of the present document, as shown in FIG. 5, the method comprises:

In Step S501, the user sets a reminder function.

The reminder function refers to a function that the terminal automatically displays a reminder message when the contact frequency in the communication statistical information of the terminal user with a contact is less than a preset contact frequency threshold. For example, the user presets the contact frequencies of the primary contacts, for example, contacting N times monthly/weekly, or contacting N times per month/week in average, when the terminal detects that the communication statistics result does not satisfy the abovementioned setting, a prompt is automatically popped up once a day.

In Step S502, the terminal monitors the communication statistics data of the contact.

The central processor module of the terminal scans and collects daily whether the contact frequency in the communication statistics information of the contact exceeds the preset contact frequency threshold or not.

In Step S503, the terminal detects that the set value is exceeded, and triggers a reminder.

The central processor module detects that the contact frequency of the terminal user with the contact is less than a preset contact frequency threshold, and notifies the user interface management module to display a reminder message. For example, the user sets that the contact frequency with a contact is to contact once per week, the central processor module needs to display a reminder message when detecting that the user does not contact with the contact in the past seven days.

In Step S504, the terminal displays a reminder message.

After the user interface management module receives the reminder notification, it displays a reminder message on the screen of the terminal.

In Step S505, it is to detect whether the user communicates with the contact or not.

The reminder message can be reminding the user to dial the contact's phone, or send a SMS or MMS to the contact. If the user calls or sends a text message according to the reminder message after seeing the reminder message displayed on the screen, that is, the user is communicating with the contact in accordance with the reminder, then the reminder process ends, otherwise step S506 is executed.

In Step 506, it is to judge whether to display the reminder message again or not.

After the man-machine interface module detects that the terminal user confirms the reminder message but does not detect that the user performs the corresponding communication operations according to the reminder message, it notifies the central processor module, and the central processor module controls the user interface management module currently not displaying the reminder message. The central processor module judges whether to display the reminder message again after a certain period of time or not according to the pre-configuration, if the pre-configuration is that the reminder message is displayed again after a certain period of time, step S504 is executed, otherwise, the user modifies the parameters in the setting, cancels or adjusts the contact frequency, or directly ends the current process.

It should be noted is that the abovementioned displayed communication statistics information supports translucent state display, which does not conflict with the original call process of the terminal.

Figure 6:
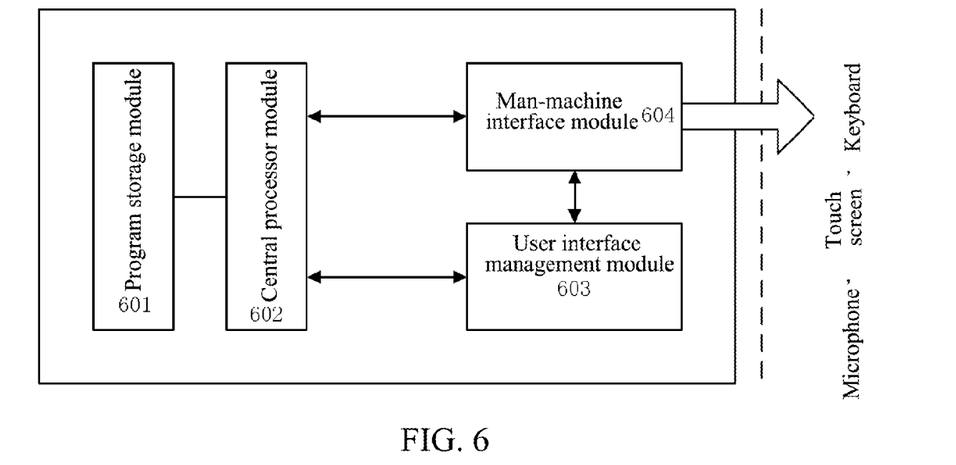
FIG. 6 is a communication display terminal provided in a sixth embodiment of the present document.

FIG. 6 is a communication display terminal provided in the sixth embodiment of the present document, and as shown in FIG. 6, the terminal comprises: a program storage module 601, a central processor module 602, a user interface management module 603 and a man-machine interface module 604, wherein:

the program storage module 601 is configured to: store the communication statistics information of the terminal user with the contact.

The program storage module 601 stores pictures, data, menus and display interfaces needed by the terminal. In addition, it also stores the operating system, application functions, and data files of the terminal. The function of the program storage module 601 is the same with that in the related art and is not repeated here.

The central processor module 602 is configured to: when detecting that the terminal user is communicating with the contact, retrieve the communication statistics information of the terminal user with the contact in the program storage module 601 and send it to the user interface management module 603. The central processor module 602 is further configured to: update and save the communication statistics information into the program storage module 601 after the communication of the terminal user with the contact ends. Wherein, the central processor module 602 learns events that the user receives a call, actively initiates a call, actively initiates an inquiry, and so on via the man-machine interface module 604, and controls the user interface management module 603 to display the inquired communication statistics information in accordance with the call and the communication events; in addition, the central processing module 602 is also responsible for receiving the setting information and setting change input by the user via the man-machine interface module, as well as detecting whether the reminder event set by the user happens or not.

The user interface management module 603 is configured to: display the communication statistical information after receiving it. The user interface management module 603 is further configured to: display the communication statistics information after receiving it before the call is connected, and no longer display the communication statistics information after the call is connected, or keep on displaying the communication statistics information before and after the call is connected, and no longer display the communication statistics information after the call ends, or display the communication statistics information when receiving or sending text messages.

The man-machine interface module 604 is configured to: detect that the user initiates a call or an inquiry operation through the touch screen, keyboard, or microphone, and notifies the inquiry operation to the central processor module 602, the central processor module 602 calls the communications statistics information, images and interfaces in the program storage module 601, and controls the user interface management module 603 to display the abovementioned contents on the screen. The man-machine interface module 604 is further configured to: display the corresponding interface on the screen and wait for the user operation, and notify the central processor module 602 when detecting that the terminal user is in a call with a contact, or sending or receiving messages to or from the contact. The function of the man-machine interface module 604 is a related technology, and not repeated here.

In summary, the embodiments of the present document achieve the statistics of the communication situations based on the contacts, which is different from the simple statistics of the phone based on a single number, each contact in accordance with the embodiment of the present document can correspond to a plurality of cell phone numbers, landline numbers, or even other contact numbers, the content of the statistics is based on a variety of modes for communicating with the contacts, including SMS, MMS, calls, and so on, so as to solve the problem that the terminal user is not clear about the communication statistical information of a contact when communicating with the contact thus not favorable for the user making judgments and actions on the current communication, moreover, the beneficial effects are that it is convenient for the user to accurately understand the communication situation with the contact.

Although the embodiments of the present document have been described in detail in the above specification, the present document is not limited thereto; a person skilled in the related art field can make various modifications according to the principles of the present document. Therefore, all the modifications made in accordance with the principles of the present document should be understood to fall within the protection scope of the present document.

INDUSTRIAL APPLICABILITY

The abovementioned technical scheme can be convenient for the user to accurately understand the communication statistical information with the contact, so as to be favorable for the user making judgments and actions on the current communication. Therefore, the present document has very strong industrial applicability.

What is claimed is:

1. A terminal communication display method, wherein, the method comprises:
   when detecting that a terminal user is communicating with a contact by using a terminal, a central processor module of the terminal retrieving communication statistics information of the terminal user with the contact in a program storage module of the terminal and sending the communication statistics information to a user interface management module of the terminal;
   the user interface management module displaying the communication statistics information after receiving the communication statistics information;
   after the communication of the terminal user with the contact ends, the central processor module updating and storing the communication statistics information into the program storage module;
   wherein the communication statistics information comprises:
   communication ranking information of the terminal user with the contact; and
   contact frequency information of the terminal user with the contact;
   wherein the method further comprises:
   the central processor module sending a contact reminder notification to the user interface management module when the contact frequency in the contact frequency information is less than a preset contact frequency threshold;
   after receiving the contact reminder notification, the user interface management module displaying a contact reminder message on a screen of the terminal so as to remind the terminal user to communicate with the contact.

2. The terminal communication display method of claim 1, wherein, the step of the central processor module detecting that the terminal user is communicating with the contact comprises:
   the central processor module detecting that the terminal user is in a call with the contact; or
   the central processor module detecting that the terminal user is sending/receiving a message to/from the contact.

3. The terminal communication display method of claim 2, wherein, the communication statistics information further comprises:
   last communication information of the terminal user with the contact.

4. The terminal communication display method of claim 2, wherein, the step of the user interface management module displaying the communication statistics information after receiving the communication statistics information comprises:
   after receiving the communication statistics information, the user interface management module displaying the communication statistics information before the call is connected, while no longer displaying the communication statistics information after the call is connected;
   after receiving the communication statistics information, the user interface management module keeping on displaying the communication statistics information before as well as after the call is connected, and no longer displaying the communication statistics information after the call ends; or
   after receiving the communication statistics information, the user interface management module displaying the communication statistics information when receiving or sending a message.

5. The terminal communication display method of claim 2, wherein, the step of the central processor module updating the communication statistics information comprises:
   the central processor obtaining current communication information with the contact;
   the central processor updating the communication statistics information according to the current communication information.

6. The terminal communication display method of claim 1, wherein, the communication statistics information further comprises:
   last communication information of the terminal user with the contact.

7. The terminal communication display method of claim 1, wherein, the step of the user interface management module displaying the communication statistics information after receiving the communication statistics information comprises:
   after receiving the communication statistics information, the user interface management module displaying the communication statistics information before the call is connected, while no longer displaying the communication statistics information after the call is connected;
   after receiving the communication statistics information, the user interface management module keeping on displaying the communication statistics information before as well as after the call is connected, and no longer displaying the communication statistics information after the call ends; or
   after receiving the communication statistics information, the user interface management module displaying the communication statistics information when receiving or sending a message.

8. The terminal communication display method of claim 1, wherein, the step of the central processor module updating the communication statistics information comprises:
   the central processor module obtaining current communication information with the contact;
   the central processor module updating the communication statistics information according to the current communication information.

9. A communication display terminal, wherein, the terminal comprises: a program storage module, a central processor module, and a user interface management module, wherein:
   the program storage module is configured to: store communication statistics information of a terminal user with contacts;
   the central processor module is configured to: retrieve the communication statistics information of the terminal user with a contact in the program storage module and send the communication statistics information to the user interface management module when detecting that the terminal user is communicating with the contact by using said communication display terminal;
   the user interface management module is configured to: display the communication statistics information after receiving the communication statistics information;
   the central processor module is configured to: update and store the communication statistics information in the program storage module after the communication of the terminal user with the contact ends;
   wherein the communication statistics information comprises:
   communication ranking information of the terminal user with the contact; and
   contact frequency information of the terminal user with the contact;
   wherein the central processor module is further configured to send a contact reminder notification to the user interface management module when the contact frequency in the contact frequency information is less than a preset contact frequency threshold;
   the user interface management module is further configured to: after receiving the contact reminder notification, display a contact reminder message on a screen of the terminal so as to remind the terminal user to communicate with the contact.

10. The communication display terminal of claim 9, the terminal further comprises a man-machine interface module, wherein:
    the man-machine interface module is configured to: detect that the terminal user is in a call with the contact or sending/receiving a message to/from the contact.

11. The communication display terminal of claim 10, wherein, the user interface management module is further configured to:
    after receiving the communication statistics information, display the communication statistics information before the call is connected, and no longer display the communication statistics information after the call is connected;
    keep on displaying the communication statistics information before and after the call is connected, and no longer display the communication statistics information after the call ends; or,
    display the communication statistics information when receiving or sending a message.

12. The communication display terminal of claim 10, wherein,
    the central processor module is further configured to: collect current communication information with the contact, and update the communication statistics information according to the current communication information.

13. The communication display terminal of claim 9, wherein, the user interface management module is further configured to:
   after receiving the communication statistics information, display the communication statistics information before the call is connected, and no longer display the communication statistics information after the call is connected;
   keep on displaying the communication statistics information before and after the call is connected, and no longer display the communication statistics information after the call ends; or,
   display the communication statistics information when receiving or sending a message.

14. The communication display terminal of claim 9, wherein,
   the central processor module is further configured to: collect current communication information with the contact, and update the communication statistics information according to the current communication information.

\* \* \* \* \*